United States Patent Office 3,328,175
Patented June 27, 1967

3,328,175
EGG WHITE COMPOSITION CONTAINING TRIETHYL PHOSPHATE HAVING ENHANCED WHIPPING PROPERTIES
Franklin E. Cunningham, Pinole, Leo Kline, El Cerrito, and Hans Lineweaver, Berkeley, Calif., assignors to the United States of America as represented by the Secretary of Agriculture
No Drawing. Filed May 19, 1965, Ser. No. 457,231
17 Claims. (Cl. 99—113)

A non-exclusive, irrevocable, royalty-free license in the invention herein described, throughout the world for all purposes of the United States Government, with the power to grant sub-licenses for such purposes, is hereby granted to the Government of the United States of America.

The objects of the invention concern the treatment of egg white and egg white products to enhance their properties, particularly their whipping properties. The invention also includes the products as new compositions of matter. A particular object of the invention is the provision of novel processes for pasteurizing egg white while retaining its intrinsic properties. Further, objects of the invention will be evident from the following description wherein parts and percentages are by weight unless otherwise specified. The abbreviation "p.p.m." used herein means parts per million.

In commercial operations egg liquids are never sterile but have a variable content of adventitious microbial flora, depending on such factors as the quality of the eggs used and the amount of care applied in the extracting, separating, and handling steps. In many cases the egg material contains salmonella organisms. The presence of these organisms is, of course, undesirable as they are pathogenic, producing the illness known as salmonellosis when ingested in sufficient quanity. Other pathogens such as staphylococci may also be present in egg materials. It is an obvious desideratum in producing good quality egg products to eliminate or at least substantially reduce the count of such bacterial contaminants. Although various techniques for reducing the bacterial count in egg products have been advocated, the processes have achieved only limited success with egg white materials. A critical factor is that the proteins of egg white are sensitive to heat. As a consequence, if egg white is subjected to a heat treatment severe enough to destroy all the contaminating organisms, coagulation of protein occurs and consequently the functional properties of the material are impaired, for example,, its normal foaming power is largely destroyed. Because of this heat sensitivity factor, pasteurization must be restricted to moderate levels of heat treatment, and, as an inevitable result, only a limited degree of bacterial destruction is attained. As an example of the situation, it is generally believed in the art that 135° F. is the maximum temperature to which egg white can be heated even for short times (1 or 2 minutes) without serious coagulation effects and at such a temperature the bacterial count is only reduced to a limited degree and does not insure a satisfactory reduction of pathogenic bacteria.

The fact that egg white proteins are sensitive to heat gives rise to problems not only in pasteurizing processes but in other operations where it is necesary to heat the egg material. Such heating may be involved, for example, in procedures for preparing concentrated liquid egg products and for preparing dehydrated egg products. Because of the possibility of protein coagulation, it is essential in such procedures to limit the maximum temperature to which the egg material is subjected and as a consequence the output of concentrated or dried product is less than that which is obtained with otherwise comparable materials which do not exhibit such heat sensitive properties. In other words, because of the heat sensitivity aspect, processes which involve application of heat to egg white are not susceptible to being carried out at the levels of efficiency which the systems or devices in question are capable of delivering.

In the co-pending application of Hans Lineweaver and Franklin E. Cunningham, Ser. No. 353,303, filed Mar. 19, 1964, now Patent 3,251,697, granted May 17, 1966, it is shown that the heat sensitivity of egg white can be reduced by a simple yet very effective means. This desirable stabilizing effect is attained by incorporating into liquid egg white a minor amount of any one of certain polyvalent metals, employed in combined form, i.e., as salts thereof. The consequent reduction in heat sensitivity yields important practical advantages. For example, it enables egg white to be subjected to heating programs more severe (as to temperature, time of heating, or both) than in known pasteurization treatments, whereby to attain enhanced destruction of adventitious microflora yet without imparing its functional properties. Also, the invention enables egg white to be processed at higher temperatures—for example in concentrating and dehydrating operations—whereby more efficient results are attained and without impairment of functional properties.

In accordance with said prior application, the stabilization effect is attained by adding to the egg white a salt of any one of the following polyvalent metals: aluminum, iron, copper, nickel, manganese, cobalt, zinc, or cadmium. Of these metals, aluminum and ferric iron are particularly preferred. It is further disclosed in said application that most effective results are attained when addition of the polyvalent metal salt is coupled with acidification of the egg white, that is, a non-toxic acid—such as hydrochloric, lactic, sulphuric or acetic—is added in such amount as to provide a pH of 6 to 8, preferably 6.5 to 7.

Although the procedure of the aforesaid prior application provides an outstanding degree of stabilization, application of heating at temperatures and times effective for pasteurization does cause some reduction in the foaming power of the treated egg white.

It is therefore a primary object of the present invention to provide means whereby to improve the results attainable in said prior process.

In accordance with the principal modification of the present invention, the procedure of said prior application is utilized in conjunction with addition of a particular agent whereby the functional properties of the egg white—for example, its foaming power—are preserved to a greater extent.

The agent used in accordance with the invention is triethyl phosphate (hereinafter abbreviated as TEP). In general, TEP is effective in a proportion of about 0.001 to 0.1%, based on the weight of liquid egg white. Optimum results are attained at a level of 0.01 to 0.05%, based on the weight of liquid egg white.

The primary advantage accruing from the addition of TEP is that the foaming power of the egg white is retained even in cases where the heat treatment applied for purpose of pasteurization (or otherwise) is so severe that in the absence of TEP the foaming power of the egg white would be markedly reduced.

Another advantage in the use of TEP is that it does not impart any foreign odor or taste. Thus cakes, meringues, and other food products made from egg white processed in accordance with the invention have an excellent odor and flavor. Indeed, application of technique of the invention does not impair the egg white in any way so that products prepared in accordance with the invention are useful in all the various applications for which egg white is conventionally used, for example, in bakery products such as angel food cakes and meringues; in salad dressings; in custards and prepared cake mixes; in icings and icing mixes, etc.

A further point is that TEP is stable in the presence of acids and polyvalent metal salts. As a consequence, it can be incorporated with an acid such as lactic and a polyvalent metal salt such as aluminum sulphate to form a single additive composition which can be added to egg white for stabilization thereof.

Another item is that TEP is effective whether added before or after application of pasteurization or other heat treatment. Ordinarily it is preferred to add TEP prior to such heat treatment since this is the most convenient time to add the other additives (polyvalent metal salt and acid). But it can equally well be added after application of pasteurization or other treatment involving application of heat. It may further be noted that TEP is itself stable to heat so that if it is added before application of pasteurization (or other heat treatment) it retains its effectiveness in the final product.

As noted hereinabove, the critical aspect of the present invention involves simply an addition of a minor proportion of TEP to egg white. The benefits of this agent are obtained with all kinds of egg white materials. For example, it may be added to egg white before it is subjected to processing steps such as pasteurization or other heat treatment. Alternatively, it may be added after such treatment. It may be used with concentrated liquid egg white or dehydrated egg white products. In such cases, the TEP may be added before or after application of concentration or dehydration. TEP may be used with egg white materials containing their natural complement of reducing sugars or with such materials which have been subjected to deglucosing, as by fermentation or enzyme action. Moreover, TEP may be used in conjunction with other additives such as sugar, lactose, corn syrup solids, antioxidants, flavoring agents, coloring agents, anti-caking agents, etc.

In the preferred embodiment of the invention, TEP is used in combination with the additives described in the aforesaid application Ser. No. 353,303. Accordingly, the additives and technique described in said application are outlined hereinbelow in paragraphs labelled 1 to 8 in order to provide a disclosure of the environment in which the present invention is most profitably utilized.

(1) Generically, one may add a salt of any one of the following polyvalent metals: aluminum, iron, copper, nickel, manganese, cobalt, zinc, or cadmium. The critical function of the salt is that it provides cations of at least one of the metals listed above: the anion moiety of the salt is of no significance, with the obvious exception that where the product is intended for food purposes it should be derived from a non-toxic acid. Typically we may use such salts as chlorides, lactates, acetates, sulphates, nitrates, etc. Since the additive is used in very low concentration, even salts which possess but a slight solubility in water can be used. In cases where the meals are capable of existing in more than one valance state, the higher valance state is preferred. Thus ferric salts are preferred to ferrous, cupric to cuprous, etc. Generally, it is preferred to use a salt of one selected metal as the additive. However, it is within the purview of the invention to use two or more of the metals, for example mixtures of salts of the above-listed metals.

(2) In adding the selected polyvalent metal salt to the egg white, it is preferred that the salt be first dissolved in water to form a dilute solution and this solution is then mixed with the egg white. Such a procedure prevents any formation of a localized high concentration of polyvalent metal ions which might cause protein precipitation or other undesirable effects. However, if the pH of the egg white is first adjusted to about 7, dilution is not needed; the salts can be incorporated into the egg white as crystals or powder.

(3) Although all of the polyvalent metals listed above exhibit the ability of decreasing the heat sensitivity of egg white, it is not maintained that all of them are of equal effectiveness. As a matter of fact, there are marked differences among them. Of the group, aluminum and iron (ferric) exhibit an approximately equal and very high ability to stabilize egg white. Of the two, aluminum is preferred as it does not cause any color change in the product; ferric iron causes development of a rosy color and is less preferred for that reason. Another item relating to our preference for aluminum is that most microbial organisms do not utilize this metal as a mineral nutrient. Thus if egg white containing added aluminum is stored under conditions at which microbial growth is possible, it will not favor growth of microorganisms to a greater extent than would untreated egg white held under the same conditions. This is not the case with some of the other polyvalent metals described herein. For example, iron is well known to be essential in the life cycle of many microorganisms and addition thereof to egg white will increase the nutrient value of the egg material with relation to microbial forms. Although the above factors play a part in pointing up the particular usefulness of aluminum, the distinction is only of importance when the treated egg white is to be stored under conditions wherein microbial growth may occur—for example, holding for substantial periods at ambient or cold-storage temperatures. Where the products are frozen, concentrated, dehydrated, or otherwise treated to substantially prevent microbial growth, the presence or absence of mineral growth factors is of no importance. Copper exhibits a somewhat lesser degree of stabilization effect than aluminum and ferric iron. Also it gives the egg white a greenish color which may be considered objectionable. The remaining metals—nickel, manganese, cobalt, zinc, and cadmium—generally display a substantially lesser degree of heat stabilization than copper, ferric iron or aluminum.

(4) The addition of the aforesaid polyvalent metals does not impair the egg material; its vital attributes such as aeration, binding, and other functional properties, flavor, etc. are retained. As a consequence, egg white with the added polyvalent metal is useful in all the various applications in which egg white is conventionally used, for example, in bakery products such as angel food cakes and meringues, in mayonnaise, salad dressings, custards, prepared cake mixes, etc. As a matter of fact, our researches have indicated that even in situations where no heat is applied the addition of the polyvalent metal, especially ferric iron or aluminum, causes small but significant increases in functional properties, e.g., increase in volume of angel food cakes. It may be noted at this point that addition of some of the metals cause a color change. For example, addition of a ferric salt gives the egg material a rosy hue. This color change is, however, of little consequence compared to the stabilizing benefit attained. Moreover, when the products are incorporated into baked goods such as cakes, the rosy color disappears. Thus at high temperatures, as used in baking, the egg material is restored to its natural color. With products such as meringues, a pink color will persist in those cases where the degree of baking is not such as to attain complete protein denaturation. A comparable situation is presented with addition of a copper salt. In such case a greenish color develops which disappears when the treated egg white is incorporated into cake ingredients and baked. As noted above, aluminum is the preferred metal because of its effectiveness plus the fact that it does not cause any color change.

(5) The said prior investigations have revealed that optimum results in stabilizing egg white against heat damage are obtained by adding such a quantity of the selected salt that the concentration of polyvalent metal ions in the mixture (egg material plus added salt) is about 0.001 to 0.003 Molar. Concentrations above this level may be used but provide little if any extra benefit. When the degree of heating of the egg material is decreased, lesser concentrations of polyvalent metal may be used. In general, it has been found that any amount of added polyvalent metal provides some stabilizing effect but ordinarily one uses sufficient to provide a concentration thereof in the mixture of at least 0.0003 Molar. Since the optimum amount of polyvalent metal required in any particular case will vary with such factors as the type of egg material, the severity of the heat treatment to which it is to be exposed, etc., one may conduct pilot trials with samples of the egg material containing graded levels of added salt, exposing them to the heat treatment selected and then subjecting the heated materials to standard tests whereby to select the level of polyvalent metal salt which provides the desired degree of protection.

(6) Since the concentration of polyvalent metals may be more conveniently measured in parts per million rather than molarity, the following table may serve to provide the required equivalents:

| Metal | Equivalent Concentrations | | |
|---|---|---|---|
| | Molar | p.p.m. (Wet basis) | p.p.m. (Dry basis) |
| Aluminum | 0.003 | 8 | 67 |
| Do | 0.001 | 27 | 225 |
| Do | 0.003 | 81 | 675 |
| Iron | 0.0003 | 17 | 140 |
| Do | 0.001 | 56 | 466 |
| Do | 0.003 | 168 | 1,398 |
| Copper | 0.0003 | 19 | 158 |
| Do | 0.001 | 64 | 534 |
| Do | 0.003 | 192 | 1,600 |

(7) Although the addition of the aforesaid polyvalent metals provides beneficial results per se, it has been observed that even more effective results are obtained when the addition thereof is coupled with an adjustment of the pH of the egg white to a level below its natural pH (this being about 9). In particular, it has been observed that when egg white with added polyvalent metal but at its natural pH is heated to temperatures above 135° F., coagulation is suppressed but the viscosity is increased substantially. This effect of viscosity increase can be prevented very simply by reducing the pH of the egg white. For best results the pH is adjusted to a level of 6.5 to 7. However, in general, beneficial results are obtained at pH's in the range 6 to 8. For the pH adjustment one may employ non-toxic acids as, for example, hydrochloric lactic, acetic, sulphuric, etc. If for any reason it is desired that the final product have its natural pH, one can add an alkaline agent—such as sodium hydroxide, carbonate, or bicarbonate—in the appropriate amount after the egg material (with added polyvalent metal salt and acid) has been subjected to a heating operation. As an example: If only pasteurization is involved in the heating step, the pH restoration would be carried out after the stabilized egg material had undergone such pasteurizing treatment. When spray drying (with or without prior pasteurizing action) is involved, the alkaline agent—sodium bicarbonate, for example—may be mixed with the dry product in such proportion that when the product is reconstituted its natural pH will be re-established.

(8) Addition of the polyvalent metal salt (preferably accompanied by pH adjustment) is applied before any heating of the egg material. (The TEP, as noted above, can be added at any time.)

In applying the present invention in situations where it is desired to produce an egg white containing a minimum of bacterial contaminants, the egg white with added TEP, polyvalent metal salt, and preferably with pH adjustment, is subjected to heat treatment, for example, in conventional pasteurization equipment. (Alternatively, the TEP may be added after completion of the heat treatment.) The conditions of the heat treatment will vary considerably dependent on many factors. For example, if a higher temperature is selected, adequate results are achieved in a shorter time than in a situation wherein a lower temperature is employed. Such factors as efficiency of heat transfer also enter the picture, for example, if the applied temperature is rapidly transferred throughout the body of material, the time of treatment will be less than in a case where a lower rate of heat transfer is attained. Another very significant variable involves the microbial population of the starting material. For example, a greater load of microbial contaminants will necessitate a higher temperature or a longer processing time or both to achieve the same degree of microbial destruction. This item is illustrated by the following example well known to those skilled in the food canning art: If the spore load on a product to be preserved is increased from 1000 spores per can to 1,000,000 spores (of the same heat resistance) the process time must be approximately doubled. The pH of the egg material also has an effect and generally a lower pH will permit a less severe heating program. A factor which cannot be predicted on any practical basis is the heat resistance of the spores encountered. Thus, the spores present in the material to be treated may exhibit thermal death rates which differ by factors of 1000 or more. Moreover, it is not practicable to determine what types of spores are present or what thermal death rates they possess. Such a program would be too extensive and involved. Moreover, it would only apply to one sample of material; others might exhibit entirely different spore populations. The net result is that the only feasible method for determining adequate heat processing program is to conduct field trials at different times and temperatures and to assay the product for microbial content. Taking into account these considerations, in carrying out the process of this invention, the treated egg white is subjected to a pasteurization procedure adequate as to temperature and time of heating to attain the desired degree of bacterial kill, yet not severe enough to damage the egg proteins. It is, of course, to be understood that because of the presence of the additives one can effectively use a combination of temperature and time greater than with previously known pasteurization treatments for egg white. Thus the temperature, the time of heating, or both, may be greater than with known procedures, resulting in a greater reduction in bacterial count yet without damage to the egg material.

Current U.S.D.A. regulations for the pasteurization of liquid egg specify that the liquid egg be held at a temperature not less than 140° F. for 3½ to 4 minutes. This procedure does not damage the properties of some types of egg liquid—for example, whole egg and yolk—and consequently can be applied to such products. It cannot be applied to egg white, however, as it would cause extensive coagulation of the proteins thereof. The examples given below demonstrate that the present invention makes it possible to utilize the said conditions with egg white without damaging it, such result having been previously impossible to attain. Indeed, we have found that utilization of the principles permits one to apply such drastic heat treatments at 140° F. for up to 10 minutes or 142° F. for up to 5 or 6 minutes, while retaining the foaming power of the egg white.

In the foregoing paragraphs, we have stressed applicatiton of TEP in combination with a polyvalent metal salt and preferably with pH adjustment also. In its broad ambit, however, the invention is not restricted to this particular embodiment. Thus TEP can be incorporated with egg white materials (egg white, per se; concentrated or dehydrated egg white; deglucosed egg white in single-strength liquid form, in concentrated liquid, or dehydrated condition; etc.) in the absence of the additives of the aforesaid application Ser. No. 353,303. Thus for example, TEP alone may be incorporated in egg white to enhance its areration properties. For similar purposes, TEP may be incorporated in pasteurized, concentrated, or dehydrated egg white products which have been prepared by conventional procedures (e.g., procedures which do not involve the teachings of Ser. No. 353,303). Furthermore, TEP may be incorporated in egg white materials in conjunction with additives which are not the subject of Ser. No. 353,303. Thus, for example, TEP may be used in conjunction with sugars, corn syrup solids, antioxidants, preservatives and stabilizers, whipping aids, and other additives known in the art.

The invention is further demonstrated by the following illustrative examples. In several of the examples, runs not representative of the invention were included for purposes of comparison.

*Example I*

A batch of egg white was acidified to pH 7 with lactic acid and sufficient aluminum sulphate was added to provide a concentration of 30 p.p.m. of aluminum. The treated egg white was then divided into three lots, each being further treated as described below:

Lot 1: No further treatment.
Lot 2: Held at 140° F. for 10 minutes, then cooled quickly.
Lot 3: TEP (0.03%) was added and the treated egg white was pasteurized as with lot 2 and cooled quickly.

The three samples were then tested for aeration ability by whipping them in a high-speed mixer and noting the time required to form medium soft peaks. In this test, a shorter time indicates a better aeration ability. Also, the specific gravities of the foams so produced were measured. A low specific gravity indicates a desirable voluminous foam.

The results are tabulated below:

| Lot | Additives | Pasteurized | Whip time (to form med. soft peaks), sec. | Sp. G. of foam |
|---|---|---|---|---|
| 1 | Lactic acid to pH 7 and 30 p.p.m. Al. | No | 30 | 0.124 |
| 2 | ...do... | Yes | 85 | 0.163 |
| 3 | TEP (0.03%), lactic acid to pH 7 and 30 p.p.m. Al. | Yes | 32 | 0.109 |

It is evident from the above data that addition of TEP (lot 3) caused a great improvement in aeration ability over that obtained with the prior additives (lot 2, lactic acid and Al) and indeed gave virtually the same whip time as with the unpasteurized sample (lot 1).

*Example II*

A batch of egg white was acidified to pH 7 with lactic acid and sufficient aluminum sulphate was added to provide 30 p.p.m. of aluminum. The treated egg white was then divided into a series of lots, each being treated as follows:

Lot 1: Pasteurized at 140° F. for 3½ minutes, then cooled quickly.
Lot 2: Pasteurized at 140° F. for 3½ minutes, cooled quickly, and 0.03% TEP added.
Lot 3: Pasteurized at 142° F. for 3½ minutes, then cooled quickly.
Lot 4: Pasteurized at 142° F. for 3½ minutes, cooled quickly, and 0.03% TEP added.

The four products were tested for aeration ability as described in Example I.

The results are given below:

| Lot | Additives | Pasteurization conditions | Whip time (to form med. soft peaks), sec. |
|---|---|---|---|
| 1 | Lactic acid to pH 7 and 30 p.p.m. Al. | 140° F., 3½ min | 52 |
| 2 | TEP (0.03%), lactic acid to pH 7, 30 p.p.m. Al. | 140° F., 3½ min | 25 |
| 3 | Lactic acid to pH 7 and 30 p.p.m. Al. | 142° F., 3½ min | 81 |
| 4 | TEP (0.03%), lactic acid to pH 7, 30 p.p.m. Al. | 142° F., 3½ min | 26 |

*Example III*

A batch of egg white was divided into two lots. Additives were added (as indicated below) and each lot was passed through a pasteurizer where it was held at 140° F. for 3½ minutes, then cooled quickly.

The cooled samples were then whipped until they produced a foam of Sp. G. 0.15, the time to produce this foam being measured. As with the previously described test, a shorter time indicates a superior whipping power. These foams were used to prepare standard angel food cakes and the height of the cakes was determined as a measure of egg quality: The higher the cake, the better the egg quality.

The results are tabulated below:

| Lot | Additives | Whip time (to form foam of Sp.G. 0.15), sec. | Angel cake height, mm. |
|---|---|---|---|
| 1 | Lactic acid to pH 7 and 30 p.p.m. Al.[1] | 120 | 116 |
| 2 | TEP (0.03%), lactic acid to pH 7, 30 p.p.m. Al.[1] | 60 | 115 |

[1] Added as aluminum sulphate.

*Example IV*

A batch of egg white was divided into three lots. Additives were incorporated therein (as indicated below) and each lot was pasteurized at 142° F. for 3½ minutes, then cooled quickly. The products were tested as described in Example III. The results are tabulated below:

ANGEL CAKE TESTS
[Products pasteurized 142° F., 3½ min.]

| Lot | Additives | Whip time (to provide foam of Sp. G. 0.17), sec. | Angel cake height, mm. |
|---|---|---|---|
| 1 | Lactic acid to pH 7 and 30 p.p.m. Al.[1] | 310 | 106 |
| 2 | TEC[2] (0.03%), lactic acid to pH 7, 30 p.p.m. Al.[1] | 100 | 111 |
| 3 | TEP (0.03%), lactic acid to pH 7, 30 p.p.m. Al.[1] | 100 | 110 |

[1] Added as aluminum sulphate.
[2] "TEC" stands for triethyl citrate, a well known whipping aid for egg white.

The above data illustrate the point that the additive (triethyl phosphate) of the invention provides results essentially as good as those obtained with triethyl citrate which is commonly employed for increasing the whipping power of egg white.

*Example V*

Samples of the same batch of egg white were adjusted to pH 7 with lactic acid and aluminum sulphate was added to give an Al concentration of 30 p.p.m. The samples were then pasteurized (140° F., 3½ min.), cooled quickly, and various amounts of TEP added (as indicated below). The samples were then assayed for whipping power by determining the time required to form medium soft peaks.

The results are tabulated below:

| Run | TEP conc., percent | Whip time, sec. | Sp. G. of foam |
|---|---|---|---|
| 1 | 0 | 45 | 0.155 |
| 2 | .001 | 40 | 0.152 |
| 3 | .005 | 30 | 0.124 |
| 4 | .01 | 25 | 0.115 |
| 5 | .03 | 19 | 0.109 |
| 6 | .05 | 10 | 0.067 |
| 7 | .1 | 5 | 0.059 |

Example VI

Additives, as indicated below, were incorporated into egg white. The samples were assayed for whipping power by determining the time required to form medium soft peaks. The results are given below:

| Run | Additives | Whip time (to foam med. soft peaks), sec. |
|---|---|---|
| 1 | Lactic acid to pH 7 and 30 p.p.m. Al [1] | 28 |
| 2 | TEP (0.03%), lactic acid to pH 7 and 30 p.p.m. Al [1] | 19 |

[1] Added as aluminum sulphate.

Having thus described the invention, what is claimed is:

1. An egg white composition having enchanced whipping properties comprising egg white and about from 0.001% to 0.1%, based on the weight of egg white, of triethyl phosphate.

2. An egg white composition having enhanced whipping properties comprising egg white, a salt of a polyvalent metal selected from the group consisting of aluminum, iron, copper, nickel, manganese, cobalt, zinc, and cadmium in a concentration of about from 0.0003 to 0.003 Molar, and about from 0.001% to 0.1% of triethyl phosphate, based on the weight of egg white.

3. The composition of claim 2 wherein the polyvalent metal is aluminum.

4. The composition of claim 2 wherein the polyvalent metal is iron in the ferric state.

5. The composition of claim 2 wherein the pH is about from 6 to 8.

6. An egg white composition having enhanced whipping properties comprising dried egg solids and triethyl phosphate in an amount to provide about from 0.001% to 0.1%, based on the weight of reconstituted egg white.

7. An egg white composition having enhanced whipping properties comprising dried egg white solids, a salt of a polyvalent metal selected from the group consisting of aluminum, iron, copper, nickel, manganese, cobalt, zinc, and cadmium in an amount to provide on reconstitution a concentration of about from 0.0003 to 0.003 Molar, and triethyl phosphate in an amount to provide about from 0.001 to 0.1%, based on the weight of reconstituted egg white.

8. The composition of claim 7 wherein the polyvalent metal is aluminum.

9. The composition of claim 7 wherein the polyvalent metal is iron in the ferric state.

10. The composition of claim 7 wherein the pH on reconstitution is about from 6 to 8.

11. A process for enhancing the whipping power of egg white which comprises incorporating therein about from 0.001 to 0.1% of triethyl phosphate, based on the weight of egg white.

12. A process for pasteurizing egg white which comprises adding to the egg white about from 0.001 to 0.1%, based on the weight of egg white, of triethyl phosphate, and heating the treated egg white at a pasteurization temperature.

13. A process for pasteurizing egg white which comprises adding to the egg white (1) a salt of a polyvalent metal selected from the group consisting of aluminum, iron copper, nickel, manganese, cobalt, zinc, and cadmium in a concentration of about from 0.0003 to 0.003 Molar and (2) about from 0.001 to 0.1%, based on the weight of egg white, of triethyl phosphate, and heating the treated egg white at a pasteurization temperature.

14. The process of claim 13 wherein said polyvalent metal is aluminum.

15. The process of claim 13 wherein the polyvalent metal is iron in the ferric state.

16. The process of claim 13 wherein the pH of the egg white is adjusted to a level of about from 6.5 to 7 prior to pasteurization.

17. A process for pasteurizing egg white which comprises incorporating into the egg white (1) an aluminum salt in an amount to provide about 30 p.p.m. of Al and (2) about 0.03% triethyl phosphate, acidifying to a pH of about 7, and heating the treated egg white at pasteurization conditions equivalent to about 140° F. for a period of about 3 to 10 minutes, then rapidly cooling the pasteurized egg white.

No references cited.

A. LOUIS MONACELL, *Primary Examiner.*

L. M. SHAPIRO, *Assistant Examiner.*